United States Patent [19]

Willis

[11] 3,843,001
[45] Oct. 22, 1974

[54] RAMP LOADING MOTORCYCLE CARRIER RACK

[76] Inventor: Howard R. Willis, 2710 Fairmount Ave., San Diego, Calif. 92105

[22] Filed: June 14, 1972

[21] Appl. No.: 262,577

[52] U.S. Cl. .......................... 214/450, 224/42.03 B
[51] Int. Cl. ............................................. B60n 9/10
[58] Field of Search ....... 224/42.03 B, 42.08, 42.05, 224/42.44, 29 R; 214/450

[56] References Cited
UNITED STATES PATENTS

| | | | |
|---|---|---|---|
| 3,128,893 | 4/1964 | Jones | 214/450 |
| 3,655,082 | 4/1972 | Garrett | 214/450 |
| 3,687,314 | 8/1972 | Haugland | 214/83.24 |
| 3,696,953 | 10/1972 | Kim | 214/450 |
| 3,720,333 | 3/1973 | Vaughn | 214/450 |
| 3,734,322 | 5/1973 | Vaillancourt | 214/450 |

*Primary Examiner*—Robert G. Sheridan
*Assistant Examiner*—Jerold M. Forsberg
*Attorney, Agent, or Firm*—Brown and Martin

[57] ABSTRACT

A carrier for motorcycles incorporating a sliding and tilting ramp. The motorcycle is driven or pushed onto the ramp which is then tilted horizontal and slid into a position aligned with the rear end of the vehicle on which the carrier is mounted.

3 Claims, 19 Drawing Figures

3,843,001

RAMP LOADING MOTORCYCLE CARRIER RACK

BACKGROUND OF INVENTION

As is common practice various carriers are attached to usual four wheeled vehicles for transporting motorcycles from one place to another. Conventional carriers are invariably secured to the road vehicle across one end thereof, usually near and parallel to the rear bumper.

Conventional carriers have several important shortcomings which I have solved.

Heretofore it has been necessary to manually lift the motorcycle on and off a carrier. Since the carriers are often attached to trucks or off-road vehicles, they are commonly higher than the bumper of a passenger car. Lifting a fairly heavy motorcycle, one wheel at a time, onto the carrier requires considerable work and exertion; it can result in hernia or back sprain to certain vulnerable individuals; the motorcycle is usually awkward and often grimy to handle.

I have solved problems associated with the usual manual loading by providing a novel ramp section to my device which permits the motorcycle to be driven or pushed, rather than lifted, into and out of its elevated position on the road vehicle.

Another shortcoming of the prior art lies in fact that there is no means for securing all motorcycles, regardless of wheel base or tire width, in the carrier immediately upon loading.

Again I have improved upon the prior art by providing dual opposing shoe-type adjustable retainers which lock the motorcycle onto the carrier as soon as it is placed into position on the carrier.

In addition I have provided a license plate bracket which also serves to hold portions of my device in position for travel.

SUMMARY OF INVENTION

Featured in my novel carrier is a portion which functions as a ramp means for loading the vehicle, and which portion itself, with motorcycle thereon, tilts and then moves parallel to the carrying vehicle bumper whereby it then functions as a portion of the carrier. For unloading the functions are reversed.

BRIEF DESCRIPTION OF THE DRAWINGS

In the drawings attached hereto and forming a part hereof.

DESCRIPTION OF PREFERRED EMBODIMENTS

Figure 1:
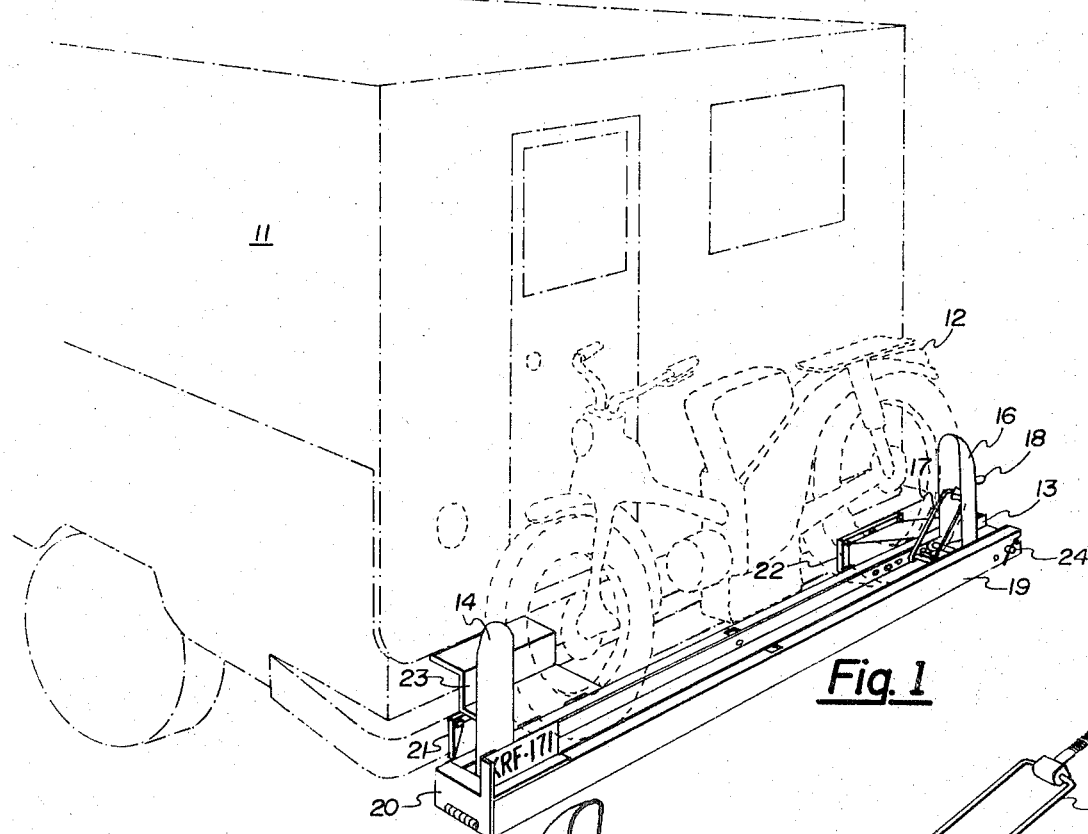
FIG. 1 is a perspective view of my device showing it in place on a road vehicle.

Referring to said drawings wherein like numerals represent like parts throughout, my novel carrier has a stationary base portion representd by the numeral 19. It constitutes the main frame of the device and is formed of channel steel, open side up, a portion of both sides of channel 19 is turned inwardly along the entire length of the channel to form a lip. This item is integrated with the road vehicle and is aligned with the rear bumper thereof, being held thereto, preferably by dual parallel support channels 53 and connecting frame structures 21 and 22.

Secured to the inner wall on each side of channel 19, along the entire length thereof, are two oppositely disposed members with U-shaped cross sections, identified herein as carriage channels 56. They are positioned with sides parallel to those of channel 19 and are near the bottom thereof, having their open portions facing each other. (See FIG. 5).

Operatively associated with channel 19 is tiltable member 13. As is illustrated, 13 is also U-shaped in cross-section and is of the proper size and dimension to fit snugly with channel 19 when telescoped therewith.

The connection between the tiltable member 13 and channel 19 is a pivotal means preferably comprising roller 51 on its axle 52. They are rotatably mounted within carriage channels 56 and bear the weight of the motorcycle 12.

Figure 2:
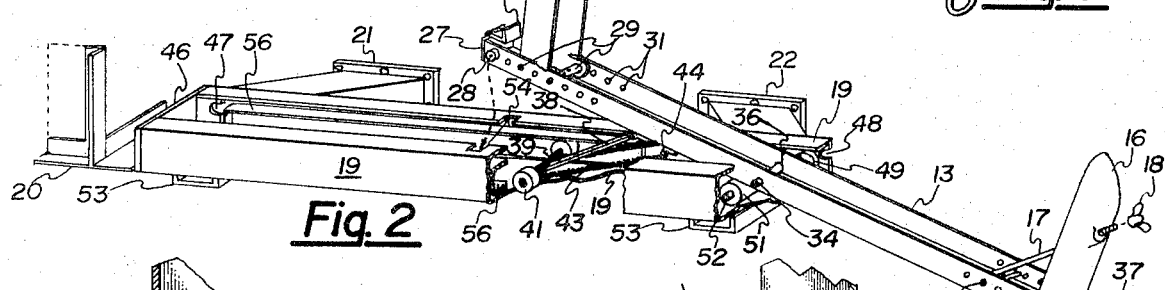
FIG. 2 is a perspective view of the device in the extended ramp position.

Two identical oppositely disposed recesses 54 of FIG. 2 are located through the lip portion of tiltable member 13. Two bosses or supplementary rollers 28, one mounted on each side of the end of tiltable members 13, are of proper size to freely pass through the recesses 54.

Figure 3:
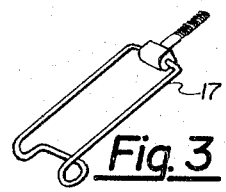
FIG. 3 is a perspective detail showing the brace portion of the rear tire retainer.
Figure 5:
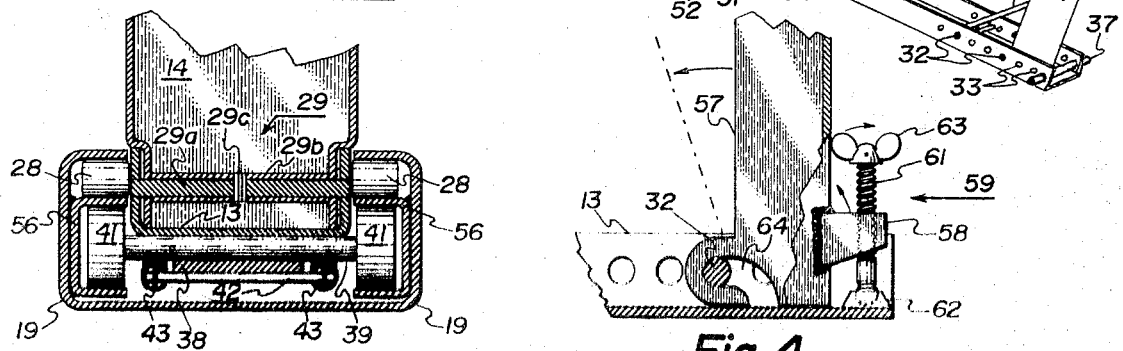
FIG. 5 is a cross sectional view at the front tire retainer portion.
Figure 4:
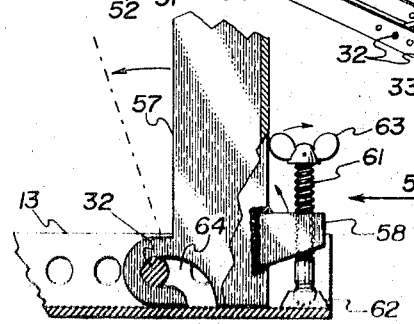
FIG. 4 is a side elevation view of a modification of the rear tire retainer illustrated in FIG. 3.
Figure 17:
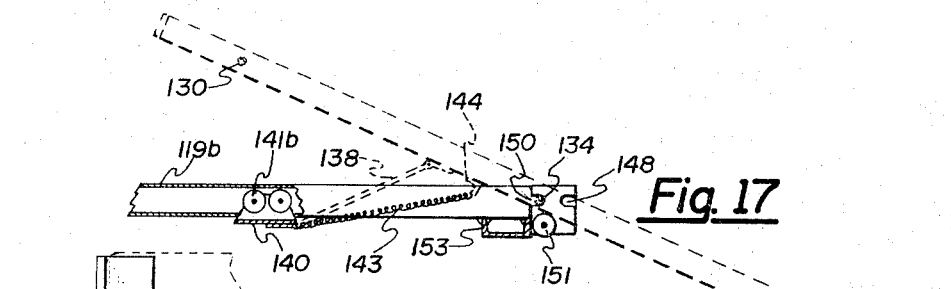
FIG. 17 is like that of FIG. 8 with modification of some parts.
Figure 18:
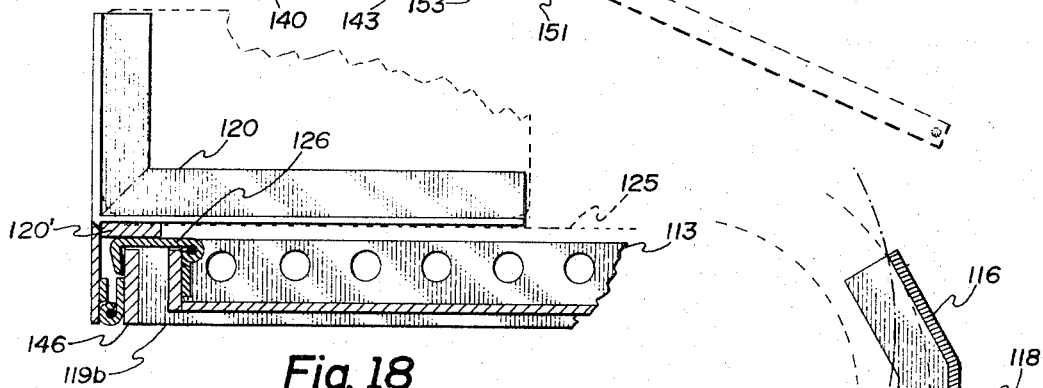
FIG. 18 is a side elevation detail of a modification of the front portion of my device, and, FIG. 19 is a side elevation detail of a modification of the rear retaining means of my device.
Figure 19:
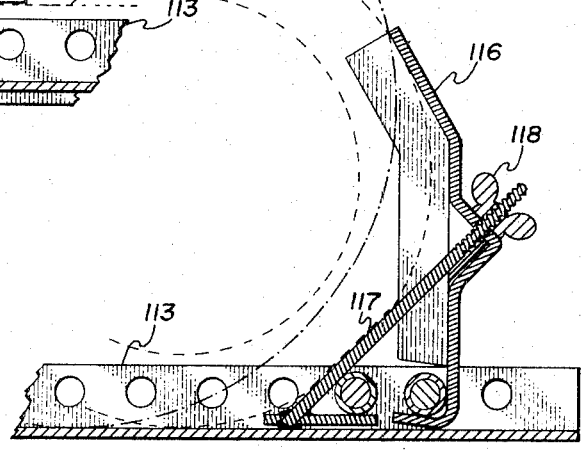

Adjustably secured to each end of tiltable member 13 are means 14 and 16 for retaining a motorcycle. Front tire retainer 14 has a curved configuration to fit snugly around various sized tires, as does rear tire holder 16. A series of opposing holes 31 accept removable pin 29 to position retainer 14 along channel 19 to accommodate motorcycles of various wheel bases. As shown in FIG. 5, pin 29 has a central rod 29a inside sleeve 29b with transverse pin 29c positioned in aligned orifices in the rod and sleeve. Removal of pin 29c permits pin 29 to be removed. At the opposite end of channel 19 a pin 32 is received in a selected pair of holes 33. Brace 17 with wing nut 18 on its screw section holds retainer 16 snugly to the tire. One end of brace 17 partially loops around pin 32 and the other end passes through retainer 16. The detailed configuration of FIG. 17 is illustrated in FIG. 3. A variation of the rear tire retainer is illustrated in FIG. 4 where tiltable rear tire retainer 57 has clamp screw bracket 58 as part thereof with curved slot 64 at the base on the side opposite the bracket. The slot partially surrounds pin 32. Wing nut 63 operates on threaded shaft 61 and bear against swivel pressure pad 62 at its opposite end to force the retainer 16 in the direction of arrow 59 when the nut 63 is turned in the direction of the arrow.

Next attention is directed to my novel connecting member between base portion 19 and tiltable member 13 comprising the assembly of axle 39 positioned across the inside surfaces of channel 19. Axle 39 mounts wheels 41 at each end thereof. Hinged support 38 has one end connected to the axle and the other end pivotally joining the underside of tiltable member 13. Dual parallel spiral tension springs 43 are connected to the underside of ramp 13 by bracket 44. Spring bar 42 (FIG. 5) connects the opposite ends of the springs to axle 39.

Figure 6:
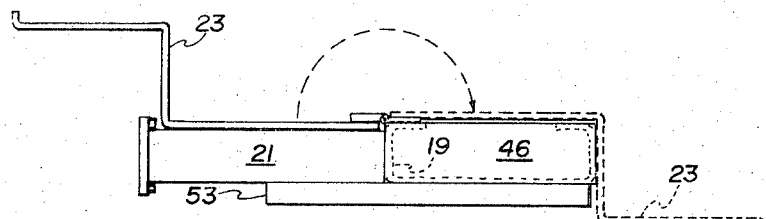
FIG. 6 is a front end view of the device showing a fold-back step portion of the device.
Figure 7:
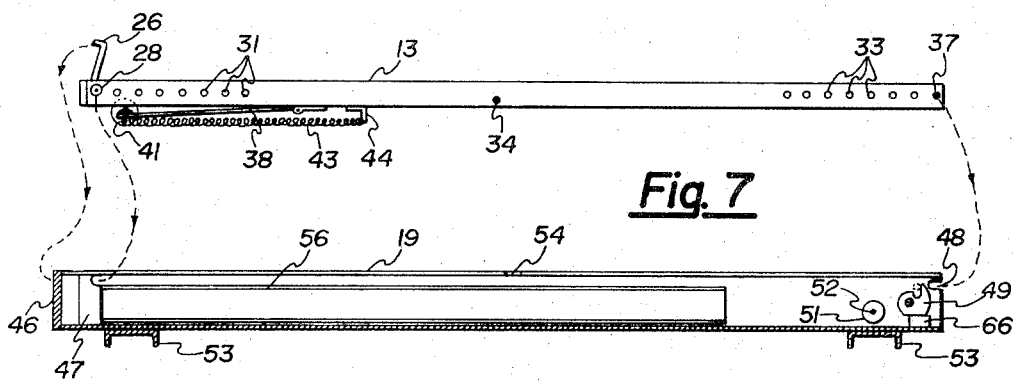
FIG. 7 is an exploded view of a side elevation of my device showing the locking arrangement of the major sections thereof.

The operation of the device will disclose a novel locking assembly I have created. This assembly prevents the motorcycle from moving laterally when it is in place for carrying. Assuming a person wishes to load a motorcycle 12, he places the device in the ramp position of FIG. 2 wherein the lower end of tiltable member 13 contacts the ground. Front retainer 14 is in place. The motorcycle is pushed or driven up the ramp, after the center of gravity of the motorcycle passes the axle 52 tiltable member 13 will tilt to the horizontal position, thereby forming a ramp. Rollers 28 pass through recesses 54. Upon rollers 28 entering the channel 19, the motorcycle and tiltable member 13 are manually slid, right to left, as a unit until they are centered on 11. Movement to left is limited by pin 37 which contacts recesses 48 in channel 19. Pins 28 drop into slots on slot plates 47 positioned in end of channel 19. This action is depicted by the arrows and broken lines of FIG. 7. At this point a hinged lock tongue 26 pivotally mounted on end of tiltable member 13 is swung over main frame end plate 46 to hold the member 13 in position. A license plate mounting bracket 20 is hingedly mounted on the end of channel 19 to swing in and out of position to hole tongue 26 in engagement. In addition, fold back step 23 is hingedly attached to channel 19 for use when motor cycle is not loaded and centered. The action of the hinged step is shown in FIG. 6.

Figure 8:
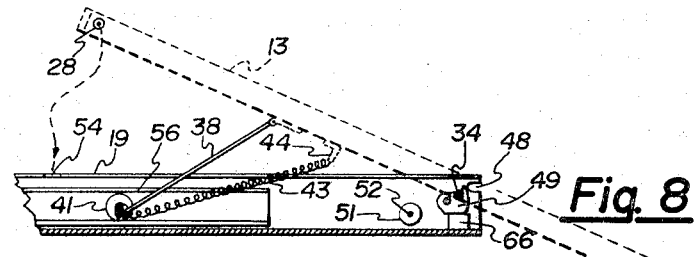
FIG. 8 is a side elevation thereof showing the movable ramp portion in phantom.
Figure 9:
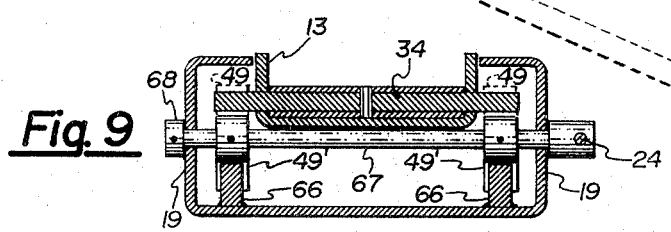
FIG. 9 is a cross-sectional view of the device looking toward the open end thereof.
Figure 10:
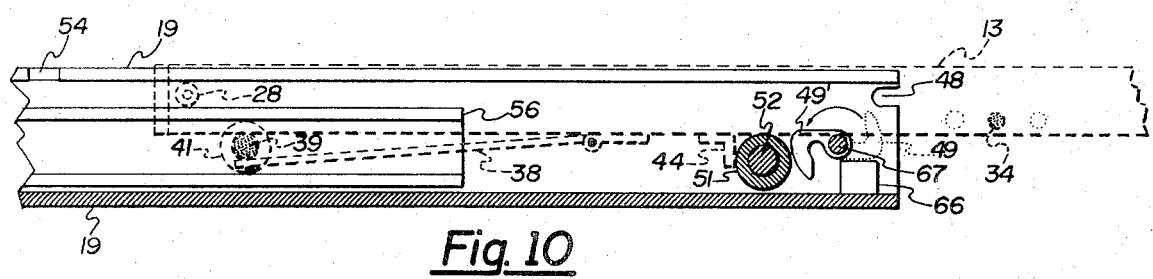
FIG. 10 is a side elevation view of that portion of the device which accommodates the ramp-to-carrier transition.
Figure 11:
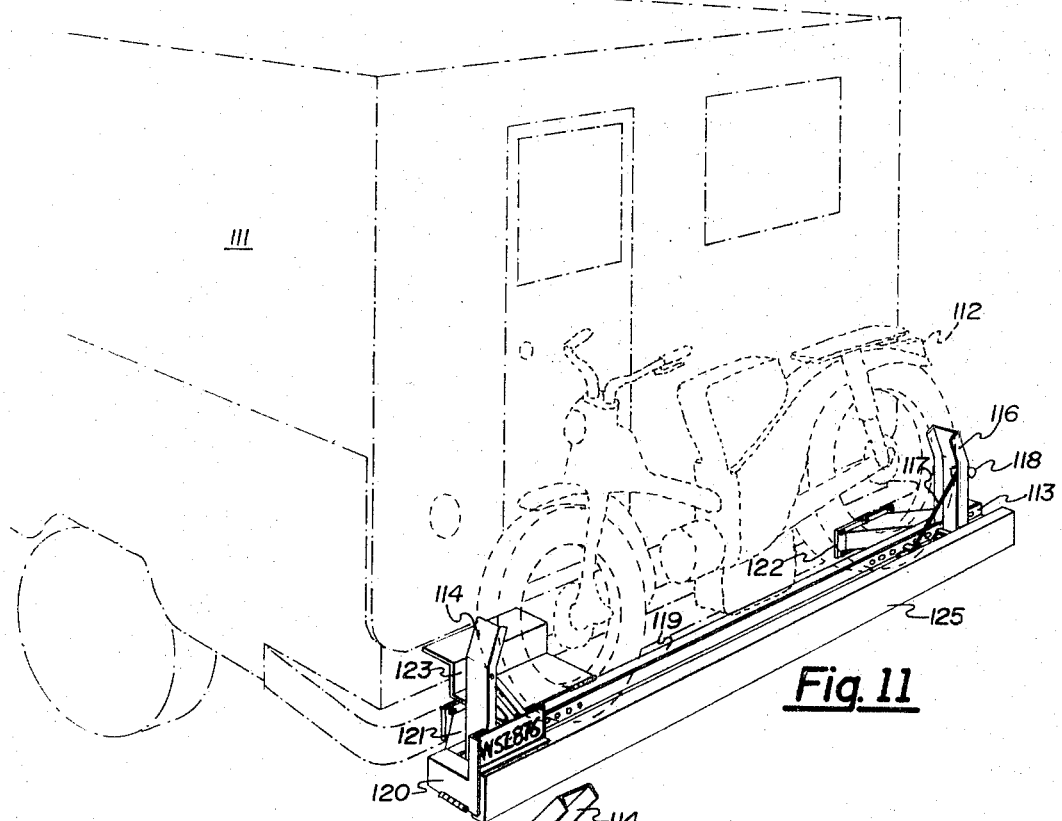
FIG. 11 is like that of FIG. 1 with modification of some parts.
Figure 12:
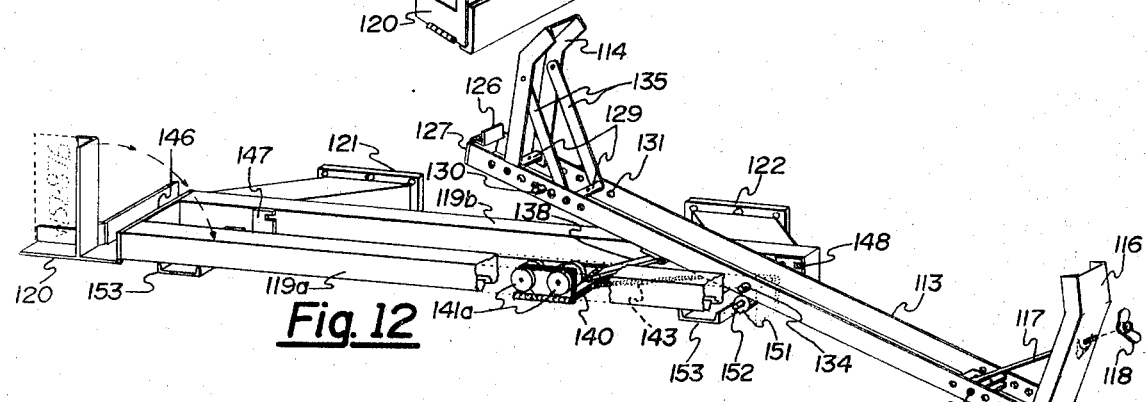
FIG. 12 is like that of FIG. 2 with modification of some parts.
Figure 14:
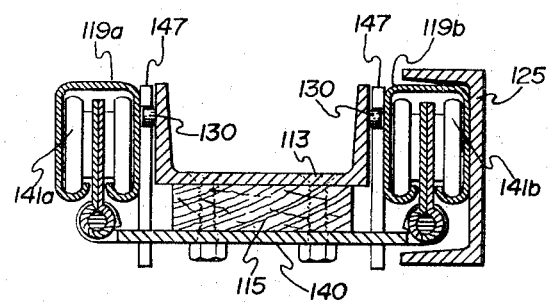
FIG. 14 is a cross-sectional view through the device showing a modification of major telescoping members.
Figure 13:
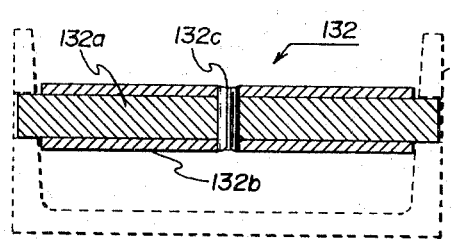
FIG. 13 is a cross-sectional view through the device showing a modification of a retaining pin.
Figure 15:
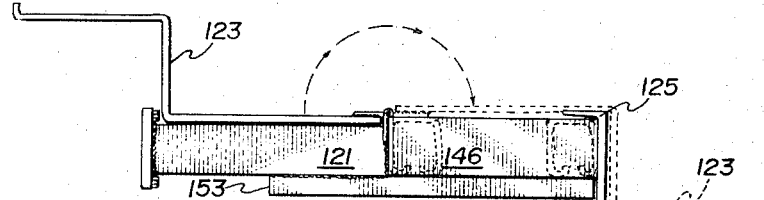
FIG. 15 corresponds to that of FIG. 6 of the preferred embodiment.
Figure 16:
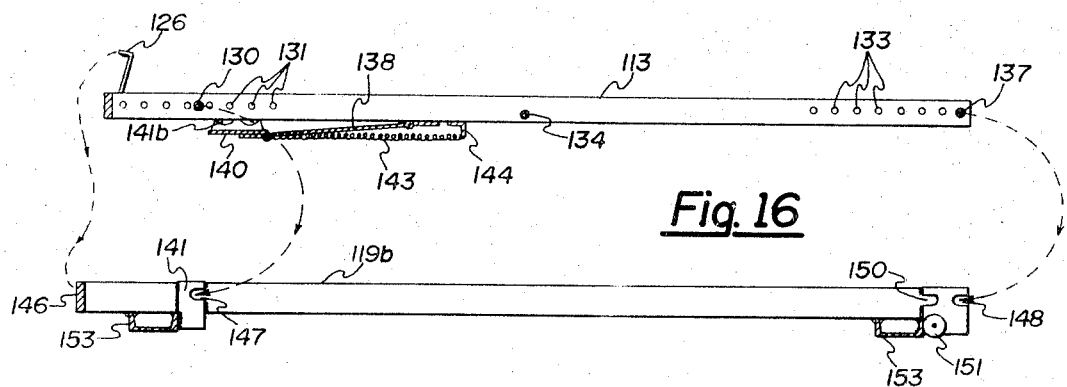
FIG. 16 is like that of FIG. 7 with modification of some parts.

When the motorcycle is to be unloaded the described locking system is manually released. Member 13 is manually slid from left to right and is initially held in a horizontal position by rollers 28 and 51. A pin stop 34 is positioned in hole 36 of tiltable member 13. Stop 34 engages with pawl 49 rotatably mounted on shaft 67 on blocks 66, each block being secured to channel 19. End stop 68 and control 24 retain the shaft (See FIG. 9). Pawl 49 is caused to move in direction of arrow of FIG. 10 by force of stop 34 moving right to left as when motorcycle is loaded. However, on tiltable member 13's return, as when unloading, stop 34 engages pawl 49 as in FIG. 8. This stops horizontal motion of member 13. Pins 28 move out of their track through recesses 54 and the unloading ramp 13 is tilted into contact with the ground.

Attention is now directed to FIGS. 11 through 19 showing certain suggested modifications of certain parts within the scope of my invention. As can be seen many numerals bear the same numerals of corresponding parts of the FIGS. 1 through 11 with 100 added in each instance. For example channel 19 of FIG. 1 is channel 119 in FIG. 11. The second embodiment functions are similar to the aforesaid preferred embodiments.

Modifications illustrated include: stop 134 (no adjustment on end stop); 125 is added bumper channel; supplemental roller 28 is deleted; and stop pin 130 is added; channel 19 is replaced by two separate roller hangers 119a and 119b connected by end plate 146 and structure 153; part 120' is a safety block added to 120; 135 are diagonal braces 114 added; optional orifices for center stop pin 134 deleted; bottom carriage plate 140 added; spring bar 42 deleted; shot plate 147 moved toward the center of channel 119 to mate with stop 130; 148 fixed end stop 150 added to replace rotatable stop 49.

Having thus described my invention, I claim as follows:

1. A carrier and loading device for motorcycles including an elongated base portion with means for attachment across the rear end of a motor vehicle and wherein the improvement comprises:

elongated tiltable means carried on said base portion including means enabling movement of said tiltable means longitudinally along said elongated base portion and rotation about a horizontal, transverse axis with respect to said elongated base portion, said elongated tiltable means serving as a carrier when disposed horizontally and serving as a ramp means when inclined, said elongated tiltable means including a rotation stop member, and including means for receiving the wheels of a motorcycle, said tiltable means being rotatable about said axis which is substantially centered along the length of said tiltable means, said base portion including means for preventing rotation of said tiltable means except when said tiltable means is laterally displaced, said means for preventing rotation comprises a horizontal flange on said base portion engaging said rotation stop member on said tiltable means, said horizontal flange having an opening sized to pass said stop member and positioned to be aligned with said stop member when said tiltable means is moved out of alignment with the rear end of said vehicle, whereby a motorcycle may be rolled onto said inclined ramp means, tilted to a horizontal orientation, and slid into alignment with the rear end of a motor vehicle.

2. A carrier as claimed in claim 1 wherein:
said tiltable means mounts a pair of oppositely directed wheel engaging tire retainers.

3. The carrier as claimed in claim 1 wherein:
latch means for retaining said tiltable means in alignment with the rear end of said vehicle, latch retainer means for holding the latch means in an engaged position.

\* \* \* \* \*